US011308428B2

(12) United States Patent
Zhang et al.

(10) Patent No.: US 11,308,428 B2
(45) Date of Patent: Apr. 19, 2022

(54) MACHINE LEARNING-BASED RESOURCE CUSTOMIZATION TO INCREASE USER SATISFACTION

(71) Applicant: International Business Machines Corporation, Armonk, NY (US)

(72) Inventors: Bo Zhang, Cary, NC (US); ChunHui Y. Higgins, Raleigh, NC (US); Chuan Ran, Cary, NC (US); Nancy Anne Schipon, Apex, NC (US); Yongchang Cui, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 16/505,992

(22) Filed: Jul. 9, 2019

(65) Prior Publication Data

US 2021/0012260 A1 Jan. 14, 2021

(51) Int. Cl.
| | |
|---|---|
| *G06Q 10/00* | (2012.01) |
| *G06N 20/00* | (2019.01) |
| *G06N 5/00* | (2006.01) |
| *G06Q 10/06* | (2012.01) |
| *G06N 5/04* | (2006.01) |

(52) U.S. Cl.
CPC ....... *G06Q 10/06315* (2013.01); *G06N 5/048* (2013.01); *G06N 20/00* (2019.01)

(58) Field of Classification Search
CPC .......... G06N 20/00; G06Q 10/06315
See application file for complete search history.

(56) References Cited

U.S. PATENT DOCUMENTS

| | | | |
|---|---|---|---|
| 7,873,567 B2 * | 1/2011 | Eder | G06Q 40/00 705/38 |
| 8,301,482 B2 * | 10/2012 | Reynolds | G06Q 10/06 705/7.29 |

(Continued)

OTHER PUBLICATIONS

Datta, H., Foubert, B., & van Heerde, H. J. The Impact of Free-Trial Acquisition on Customer Usage, Retention, and Lifetime Value. (Year: 2015).*

(Continued)

*Primary Examiner* — Hafiz A Kassim
*Assistant Examiner* — Matheus Ribeiro Stivaletti
(74) *Attorney, Agent, or Firm* — Yee & Associates, P.C.

(57) ABSTRACT

Customizing computing resource allocation based on machine learning is provided. A plurality of current users of a service are evaluated based on attributes of each current user. A user value score is generated for each current user based on the attributes. The plurality of current users is clustered into a plurality of user groups based on the user value score. A likelihood of each prospective user becoming a paying customer is predicted based on collected behavior data corresponding to each prospective user. A likelihood of an application corresponding to the service and associated with a particular user will misbehave is predicted based on resource usage and features of the application. Resource allocation to the application corresponding to the service and associated with the particular user is customized based the likelihood that the application will misbehave and whether the particular user is a current user or a prospective user.

13 Claims, 7 Drawing Sheets

(56) References Cited

U.S. PATENT DOCUMENTS

| | | | | |
|---|---|---|---|---|
| 8,498,915 | B2* | 7/2013 | Eder | G06Q 40/06 |
| | | | | 705/36 R |
| 8,694,455 | B2* | 4/2014 | Eder | G06Q 40/08 |
| | | | | 706/45 |
| 8,861,691 | B1* | 10/2014 | De | H04M 15/41 |
| | | | | 379/111 |
| 9,152,694 | B1* | 10/2015 | Padidar | H04L 63/105 |
| 9,444,824 | B1* | 9/2016 | Balazs | H04L 63/08 |
| 9,953,281 | B2 | 4/2018 | Wiig et al. | |
| 10,026,070 | B2 | 7/2018 | Thorpe et al. | |
| 10,373,064 | B2* | 8/2019 | Mascaro | G06N 5/003 |
| 10,438,001 | B1* | 10/2019 | Hariprasad | G06F 21/577 |
| 10,572,653 | B1* | 2/2020 | Semichev | G06N 20/00 |
| 10,600,004 | B1* | 3/2020 | Misko | G06N 7/005 |
| 10,621,597 | B2* | 4/2020 | Mascaro | G06N 20/00 |
| 10,621,677 | B2* | 4/2020 | Mascaro | G06Q 40/123 |
| 10,637,762 | B1* | 4/2020 | Traylor | H04L 41/0806 |
| 10,867,267 | B1* | 12/2020 | Navaratna | G06Q 10/0635 |
| 2002/0046096 | A1* | 4/2002 | Srinivasan | G06Q 30/0204 |
| | | | | 705/14.13 |
| 2007/0156673 | A1* | 7/2007 | Maga | G06Q 30/02 |
| 2009/0228397 | A1* | 9/2009 | Tawakol | G06Q 30/0601 |
| | | | | 705/80 |
| 2011/0099048 | A1* | 4/2011 | Weiss | H04W 4/029 |
| | | | | 705/7.34 |
| 2012/0022917 | A1* | 1/2012 | Lawton | G06Q 30/02 |
| | | | | 705/7.31 |
| 2012/0059725 | A1* | 3/2012 | Colson | G06Q 30/02 |
| | | | | 705/14.67 |
| 2013/0231999 | A1* | 9/2013 | Emrich | G06Q 30/0271 |
| | | | | 705/14.43 |
| 2013/0346253 | A1* | 12/2013 | Gustafson | G06Q 30/04 |
| | | | | 705/26.81 |
| 2014/0279641 | A1* | 9/2014 | Singh | G06Q 50/265 |
| | | | | 705/325 |
| 2015/0032503 | A1* | 1/2015 | Chander | G06Q 30/0201 |
| | | | | 705/7.29 |
| 2015/0302436 | A1* | 10/2015 | Reynolds | G06Q 30/0201 |
| | | | | 705/7.32 |
| 2015/0378714 | A1* | 12/2015 | Katariya | G06F 8/65 |
| | | | | 717/170 |
| 2016/0055496 | A1* | 2/2016 | Goldberg | G06Q 30/0202 |
| | | | | 705/7.31 |
| 2016/0071072 | A1* | 3/2016 | Bailo | G06Q 20/4016 |
| | | | | 705/40 |
| 2016/0253688 | A1* | 9/2016 | Nielsen | G06F 16/337 |
| | | | | 705/7.31 |
| 2016/0267408 | A1* | 9/2016 | Singh | G06N 7/005 |
| 2016/0267545 | A1* | 9/2016 | Glass | H04L 67/02 |
| 2017/0006135 | A1* | 1/2017 | Siebel | H04L 69/40 |
| 2017/0039637 | A1* | 2/2017 | Wandelmer | G06Q 40/025 |
| 2017/0052536 | A1* | 2/2017 | Warner | G06Q 50/06 |
| 2017/0091812 | A1* | 3/2017 | Wong | G06Q 30/0253 |
| 2017/0200087 | A1* | 7/2017 | Mascaro | G06Q 40/12 |
| 2017/0206365 | A1* | 7/2017 | Garcia | G06F 21/6245 |
| 2017/0206599 | A1* | 7/2017 | Garcia | G06Q 40/025 |
| 2017/0214708 | A1 | 7/2017 | Gukal et al. | |
| 2017/0220933 | A1* | 8/2017 | Gonguet | G06Q 10/101 |
| 2017/0308960 | A1* | 10/2017 | Mascaro | G06N 5/003 |
| 2017/0316438 | A1* | 11/2017 | Konig | G06Q 30/016 |
| 2017/0372336 | A1* | 12/2017 | Han | G06Q 10/067 |
| 2017/0372337 | A1* | 12/2017 | Han | G06Q 30/0202 |
| 2017/0372371 | A1* | 12/2017 | Dorai | G06Q 30/0269 |
| 2018/0032890 | A1* | 2/2018 | Podgorny | G06Q 30/016 |
| 2018/0033009 | A1* | 2/2018 | Goldman | G06Q 40/10 |
| 2018/0033089 | A1* | 2/2018 | Goldman | G06Q 40/10 |
| 2018/0053188 | A1* | 2/2018 | Zoldi | G06Q 20/4016 |
| 2018/0067734 | A1* | 3/2018 | Prasad | G06F 11/3438 |
| 2018/0137526 | A1* | 5/2018 | Haruta | G06F 16/2465 |
| 2018/0144389 | A1* | 5/2018 | Fredrich | G06Q 30/0271 |
| 2018/0150897 | A1* | 5/2018 | Wang | G06F 16/635 |
| 2018/0239870 | A1* | 8/2018 | Goldman | G16H 40/20 |
| 2018/0243656 | A1* | 8/2018 | Aghdaie | A63F 13/67 |
| 2018/0276404 | A1* | 9/2018 | Dotan-Cohen | G06F 9/542 |
| 2018/0374025 | A1* | 12/2018 | Kotamraju | G06F 8/77 |
| 2019/0034976 | A1* | 1/2019 | Hamedi | G06Q 30/0204 |
| 2019/0043063 | A1* | 2/2019 | Johnsen | H04L 67/306 |
| 2019/0080288 | A1* | 3/2019 | Daniels | G06F 21/6209 |
| 2019/0102536 | A1* | 4/2019 | Chopra | G06F 21/45 |
| 2019/0102840 | A1* | 4/2019 | Perl | B60W 40/09 |
| 2019/0114569 | A1* | 4/2019 | Palmer, II | G06F 40/35 |
| 2019/0130453 | A1* | 5/2019 | Sasapu | G06Q 30/0631 |
| 2019/0245882 | A1* | 8/2019 | Kesavan | H04L 63/20 |
| 2019/0260795 | A1* | 8/2019 | Araiza | G06F 3/0486 |
| 2019/0266622 | A1* | 8/2019 | Turnbull | G06N 20/00 |
| 2019/0311310 | A1* | 10/2019 | Miller | G06Q 10/0635 |
| 2019/0312898 | A1* | 10/2019 | Verma | G06N 3/084 |
| 2019/0347675 | A1* | 11/2019 | Yang | A63F 13/70 |
| 2019/0373071 | A1* | 12/2019 | Ramachandran | G06F 9/4451 |
| 2020/0013027 | A1* | 1/2020 | Zhu | G06Q 20/0658 |
| 2020/0153711 | A1* | 5/2020 | Chauhan | G06N 20/00 |
| 2020/0252804 | A1* | 8/2020 | Kim | H04W 12/02 |
| 2020/0264965 | A1* | 8/2020 | Harutyunyan | H04L 41/142 |
| 2020/0366495 | A1* | 11/2020 | Mahoney | H04L 9/12 |
| 2020/0388121 | A1* | 12/2020 | Sarkar | G08B 13/14 |

OTHER PUBLICATIONS

Nedeltchev et al., "Infrastructure as a Service Cloud and Data Center Predictive Expanding and Contracting Workload Optimization Based on Real Time Usage," An IP.com Prior Art Database Technical Disclosure, Dec. 4, 2017, Copyright 2017, 9 pages. https://ip.com/IPCOM/000251798.

Anonymous, "Using Customer Support Interaction Data to Estimate Customer Satisfaction," An IP.com Prior Art Database Technical Disclosure, Jan. 5, 2018, 34 pages. https://ip.com/IPCOM/000252343.

Anonymous, "Cloud Instance Provisioning Acceleration via Predictive Deployment Analysis and Cognitive Learning," An IP.com Prior Art Database Technical Disclosure, Jan. 30, 2019, 4 pages. https://ip.com/IPCOM/000257295.

Zhan et al., "Cloud Computing Resource Scheduling and a Survey of its Evolutionary Approaches," ACM Computing Surveys, vol. 47, No. 4, Article 63, Published Jul. 2015, 34 pages.

Yadwadkar,"Machine Learning for Automatic Resource Management in the Datacenter and the Cloud," Technical Report No. UCB/EECS-2018-110, Electrical Engineering and Computer Sciences, University of California at Berkeley, Aug. 10, 2018, 125 pages. http://www2.eecs.berkeley.edu/Pubs/TechRpts/2018/EECS-2018-110.pdf.

Ao et al., "Research on Cloud Resource Optimization Model Based on Users Satisfaction," 2016 13th Web Information Systems and Applications Conference (WISA), Wuhan, China, Sep. 2016, pp. 99-102.

Mell et al., "The NIST Definition of Cloud Computing", Computer Security Division, National Institute of Standards and Technology, Jan. 2011, 7 pages.

Venugopalan et al., "Optimizing Customer Support with Machine Intelligence," Keep Challenging, Dec. 2016, Cognizant, Copyright 2016, 12 pages.

Aruna et al., "Customer Satisfaction—Aware Profit Optimization Model to Find the Numeric Optimal Cloud Configuration for Cloud Service Providers," International Journal of Innovative Research in Science, Engineering and Technology, vol. 7, Issue 11, Nov. 2018, 5 pages.

* cited by examiner

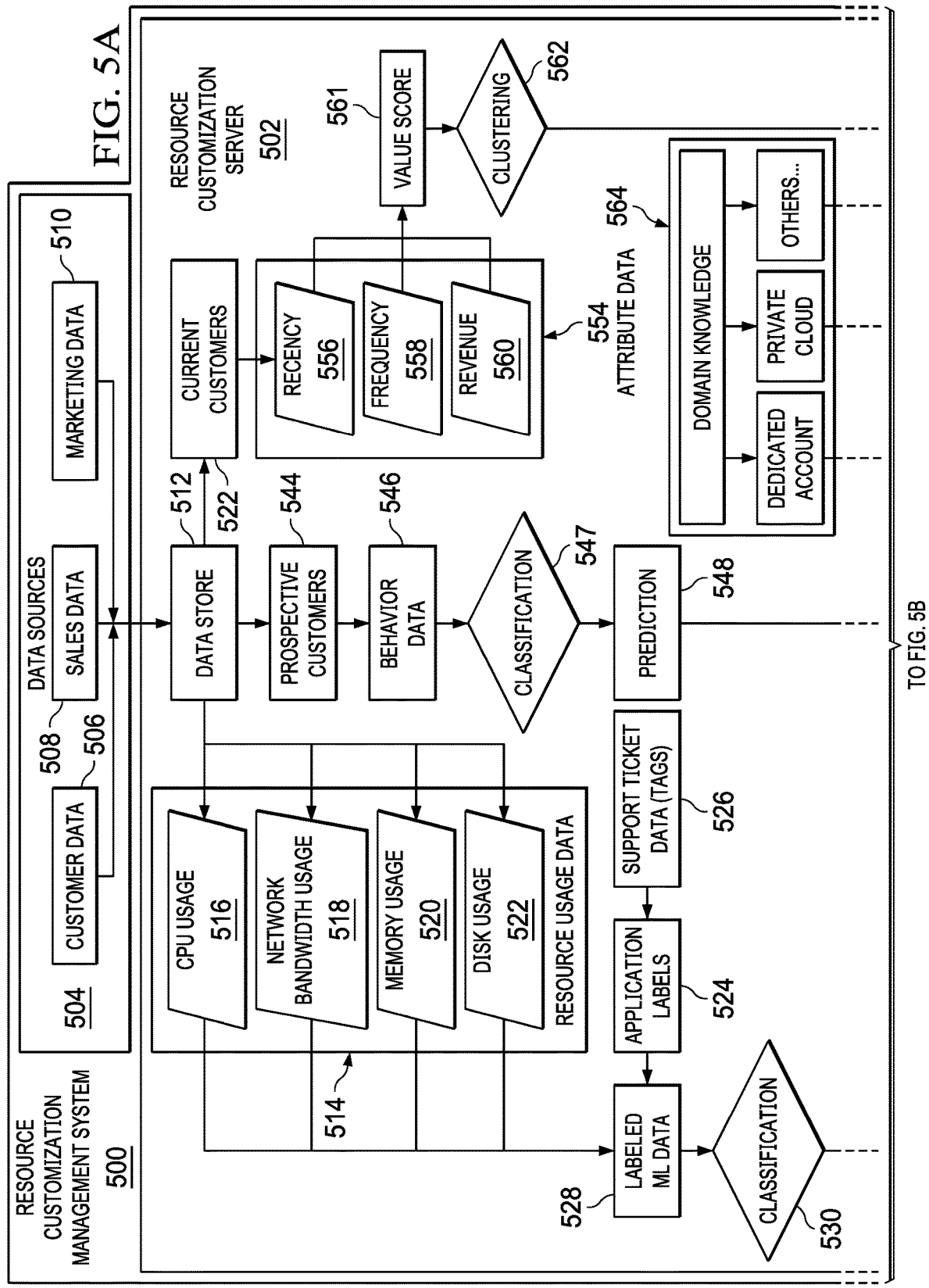

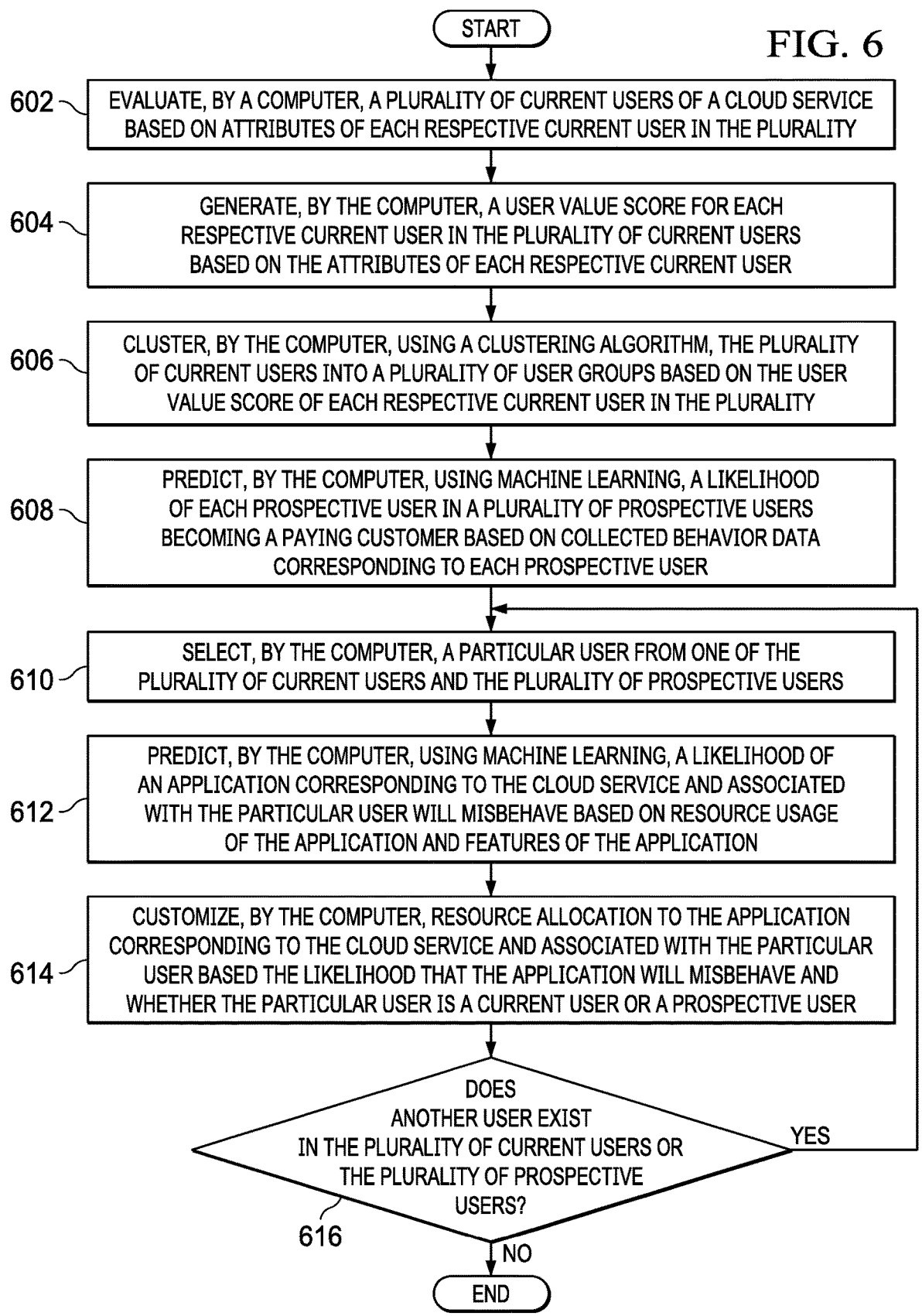

MACHINE LEARNING-BASED RESOURCE CUSTOMIZATION TO INCREASE USER SATISFACTION

BACKGROUND

1. Field

The disclosure relates generally to cloud computing and more specifically to customizing cloud resource allocation and utilization based on machine learning to increase user satisfaction.

2. Description of the Related Art

Cloud computing is on-demand availability of computer system resources, such as, for example, data storage and computing power, without direct active management by a user of a cloud service. A computer system resource may be any physical or virtual component with limited availability within a computer system. Managing computing system resources is referred to as resource management and includes both preventing resource leaks (i.e., not releasing a resource when a process has finished using the resource) and dealing with resource contention when multiple processes want to access the same resource. The term cloud computing is generally used to describe data centers available to many users via the Internet on a pay-for-use basis. Cloud computing relies on sharing of computer system resources to achieve coherence and economies of scale. Resource management utilizes available computer system resources to achieve established goals (e.g., service level agreements).

SUMMARY

According to one illustrative embodiment, a computer-implemented method for customizing computing resource allocation based on machine learning is provided. A plurality of current users of a service are evaluated based on attributes of each respective current user in the plurality of current users. A user value score is generated for each respective current user in the plurality of current users based on the attributes of each respective current user. The plurality of current users is clustered into a plurality of user groups based on the user value score of each respective current user in the plurality of current users. Using the machine learning, a likelihood of each prospective user in a plurality of prospective users becoming a paying customer is predicted based on collected behavior data corresponding to each prospective user. Using the machine learning, a likelihood of an application corresponding to the service and associated with a particular user will misbehave is predicted based on resource usage of the application and features of the application. Resource allocation to the application corresponding to the service and associated with the particular user is customized based the likelihood that the application will misbehave and whether the particular user is a current user or a prospective user. According to other illustrative embodiments, a computer system and computer program product for allocating computing resources based on machine learning are provided.

BRIEF DESCRIPTION OF THE DRAWINGS

FIGS. 5A-5B are a diagram illustrating an example of a resource customization management system in accordance with an illustrative embodiment; and FIG. 6 is a flowchart illustrating a process for customizing cloud resource allocation based on machine learning in accordance with an illustrative embodiment.

DETAILED DESCRIPTION

Figure 1:
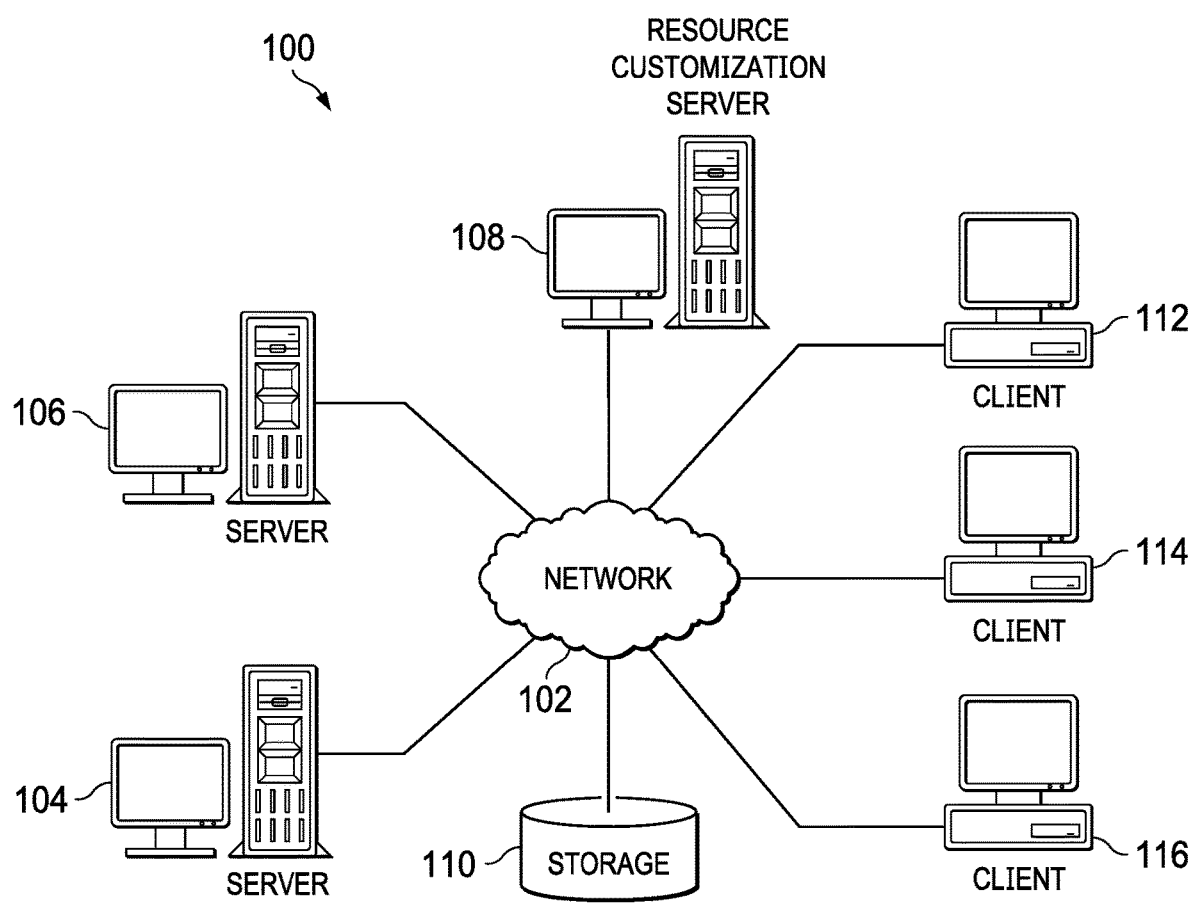
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and resource customization server 108 connect to network 102, along with storage 110. Server 104, server 106, and resource customization server 108 may be, for example, server computers with high-speed connections to network 102. In addition, server 104 and server 106 may provide one or more services, such as, for example, event monitoring services, financial services, banking services, governmental services, educational services, reservation services, entertainment services, streaming data services, data retrieval services, and the like, to client devices. Also, it should be noted that server 104 and server 106 may each represent a plurality of computing nodes in one or more cloud environments. Alternatively, server 104 and server 106 may each represent clusters of computers in one or more data centers.

Resource customization server 108 provides a resource customization service to server 104 and server 106. In other words, resource customization server 108 customizes allocation of resources to server 104 and server 106. Resource customization server 108 customizes allocation of resources to server 104 and server 106 based on, for example, resource usage of an application (e.g., a streaming stock quote application) corresponding to a service (e.g., a streaming stock quote service) provided by server 104 or server 106, whether a user (e.g., customer) associated with the application is a current user or a prospective user, and likelihood of the prospective user becoming a paying user in the future. Application resource usage may include, for example, one or more of processor usage, memory usage, storage space usage, network bandwidth usage, and the like.

Client 112, client 114, and client 116 also connect to network 102. Clients 112, 114, and 116 are clients of server 104 and server 106. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart televisions, smart appliances, gaming devices, kiosks, and the like. Users of clients 112, 114, and 116 may utilize clients 112, 114, and 116 to access and utilize the services provided by server 104 and server 106.

Storage 110 is a network storage device capable of storing any type of data in a structured format or an unstructured format. In addition, storage 110 may represent a plurality of network storage devices. Further, storage 110 may store identifiers and network addresses for a plurality of different servers, identifiers and network addresses for a plurality of different client devices, identifiers for a plurality of different users, identifiers for a plurality of services, user attribute data corresponding to a plurality of current service users, user behavior data corresponding to a plurality of prospective service users, service sales data, service marketing data, service application resource usage data, and the like. Furthermore, storage 110 may store other types of data, such as authentication or credential data that may include user names, passwords, and biometric data associated with users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 112.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
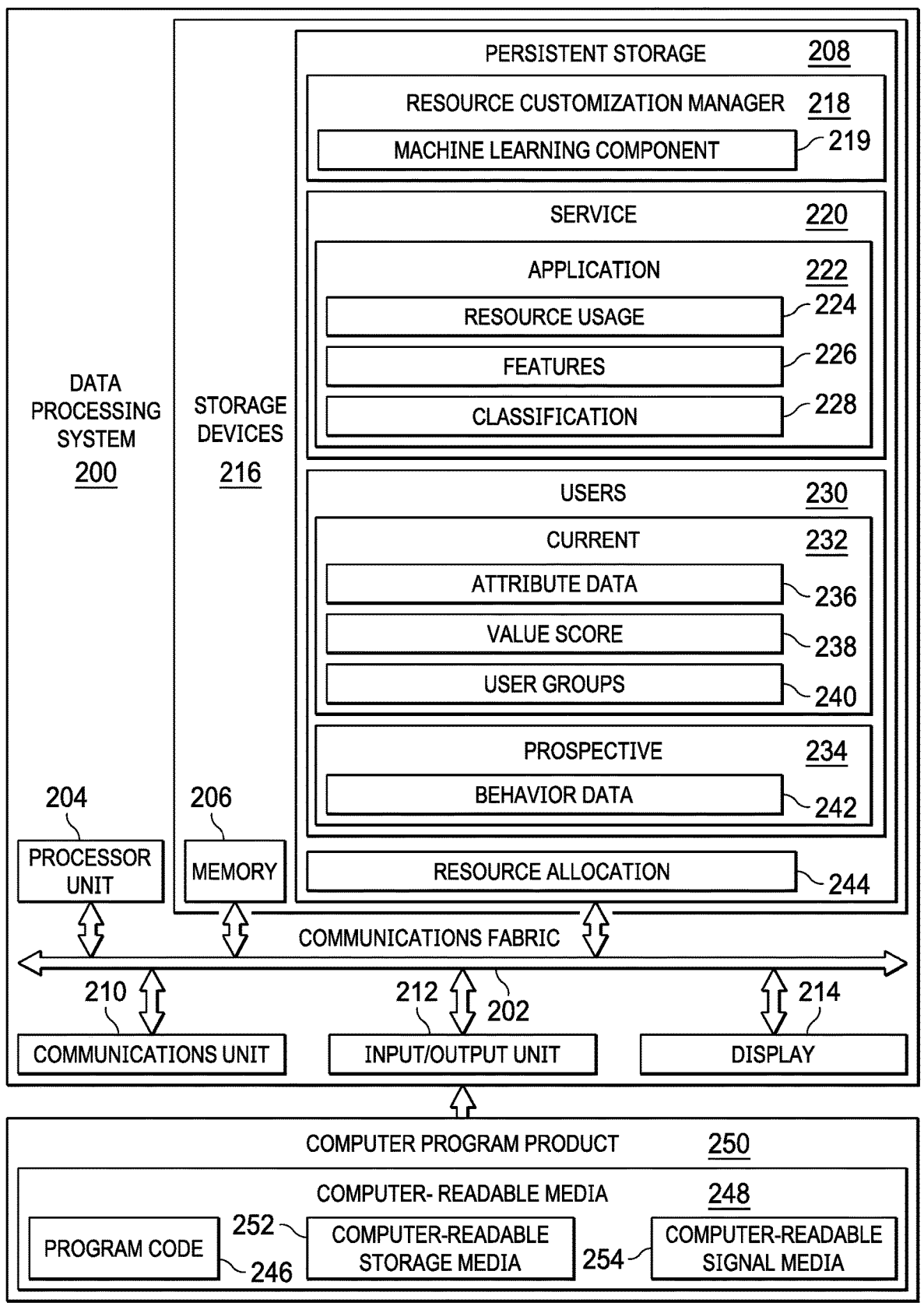
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as resource customization server 108 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores resource customization manager 218. However, it should be noted that even though resource customization manager 218 is illustrated as residing in persistent storage 208, in an alternative illustrative embodiment resource customization manager 218 may be a separate component of data processing system 200. For example, resource customization manager 218 may be a hardware component coupled to communication fabric 202 or a combination of hardware and software components.

Resource customization manager 218 controls the process of customizing resource allocation for a given user of a cloud service based on machine learning. Resource customization manager 218 includes machine learning component 219. Machine learning component 219 may be, for example, an artificial intelligence algorithm. Resource customization manager 218 utilizes machine learning component 219 to classify data and make predictions without using explicit instructions, relying on patterns and inference.

Service 220 represents an identifier of the cloud service. Service 220 may represent any type of cloud service provided to users (e.g., customers). Application 222 represents one or more identifiers for a set of one or more applications corresponding to service 220. Resource usage 224 represents resource utilization data corresponding to application 222. The resource utilization data may include, for example, amount of processor usage, memory usage, storage usage, network usage, and the like. Features 226 represent traits or aspects of application 222, such as, for example, whether application 222 corresponds to a trial account, number of days since application 222 was last updated, and the like. Classification 228 represents an application class, category, or type corresponding to application 222, such as, for example, a trial application, a zombie application, an abuse application, and the like. A trial application is an application that corresponds to a trial user subscription to service 220. The trial user subscription is, for example, a non-paying user subscription to the cloud service for a defined period of time. A zombie application is an inactive application that continues to consume cloud resources. An abuse application is an application that consumes more cloud resources than required by the application. In other words, an abuse application uses extra resources not required by the application.

Resource customization manager 218 identifies classification 228 for application 222 based on resource usage 224 and features 226. Resource customization manager 218 may also identify classification 228 for application 222 based on any labels or tags corresponding to application 222. Labels may be assigned to application 222 by, for example, a system administrator. Tags may be assigned to application 222 by, for example, a support ticketing system.

Users 230 represent identifiers for a plurality of different users, such as, for example, customers, of service 220. Users 230 include current users 232 and prospective users 234. Current users 232 may represent, for example, existing paying customers of service 220. Attribute data 236 represent characteristics of current users 232. Attribute data 236 may include, for example, customer recency data, customer frequency data, customer revenue data, and the like. Customer recency data are information corresponding to a most recent or last use of service 220 by a given current customer/user. Customer frequency data are information corresponding to how often a given current customer/user utilizes service 220. Customer revenue data are information corresponding on how much money a given current customer/user is paying to utilize service 220.

Value score 238 represents an amount or degree of importance or worth a given current customer/user is to service 220. Resource customization manager 218 utilizes attribute data 236 to calculate value score 238 for each respective customer/user in current users 232. User groups 240 represent a plurality of different groups or sets of current users 232. Resource customization manager 218 generates user groups 240 based on value score 238 of each respective user in current users 232. Resource customization manager 218 may generate user groups 240 by utilizing, for example, a clustering algorithm, such as a k-means clustering algorithm or the like. User groups 240 may include, for example, a high-value user group, a medium-value user group, a low-value user group, and the like.

Prospective users 234 may represent, for example, non-paying trial period customers of service 220. Behavior data 242 represent information corresponding to activities or conduct of each respective customer/user in prospective user 234. Behavior data 242 for a particular customer/user may include, for example, a history of which applications the customer used during the trial period, a frequency of application use, how long an application was used during a trial session, and the like. Resource customization manager 218 utilizes machine learning component 219 to predict a likelihood of each respective user in prospective users 234 becoming a paying customer in the future based on behavior data 242 corresponding to each prospective user.

Resource allocation 244 represent a customized allocation of cloud resources to application 222 of service 220. The cloud resources may include, for example, one or more of processor resources, memory resources, storage resources, network resources, and the like. Resource customization manager 218 customizes resource allocation 244 for each user in users 230 based on several factors, such as, for example, classification 228 of application 222, a particular user group in user groups 240 that a given user in current users 230 is a member of, a level of likelihood, such as low-likelihood or high-likelihood, of a particular user in prospective users 234 becoming a paying customer, and the like.

As a result, data processing system 200 operates as a special purpose computer system in which resource customization manager 218 in data processing system 200 enables customization of resource allocation for each user of a cloud service based on machine learning to increase user experience. In particular, resource customization manager 218 transforms data processing system 200 into a special purpose computer system as compared to currently available general purpose computer systems that do not have resource customization manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4 G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
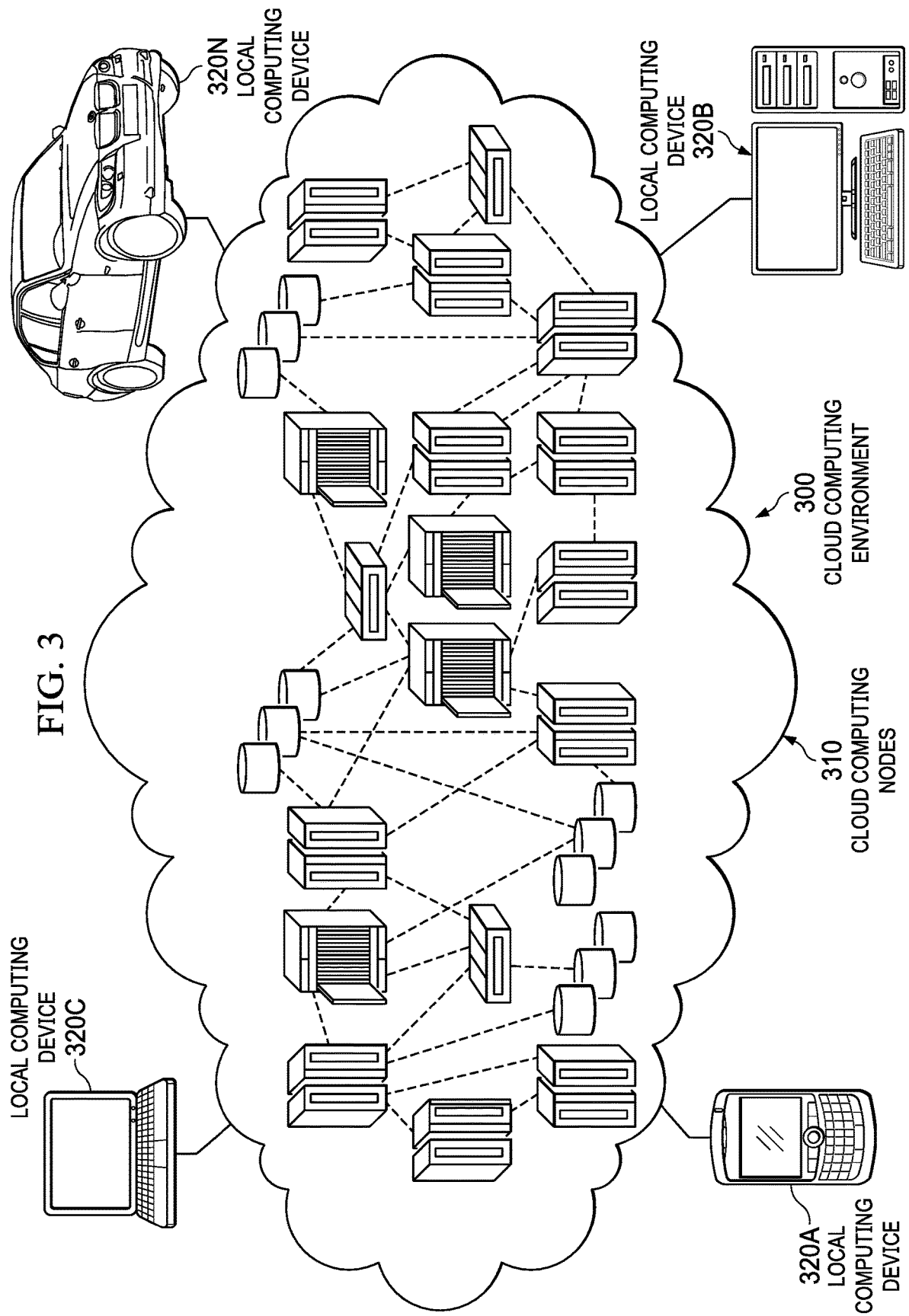
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104, server 106, and resource customization server 108 in FIG. 1. Local computing devices 320A-320N may be, for example, clients 112-116 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
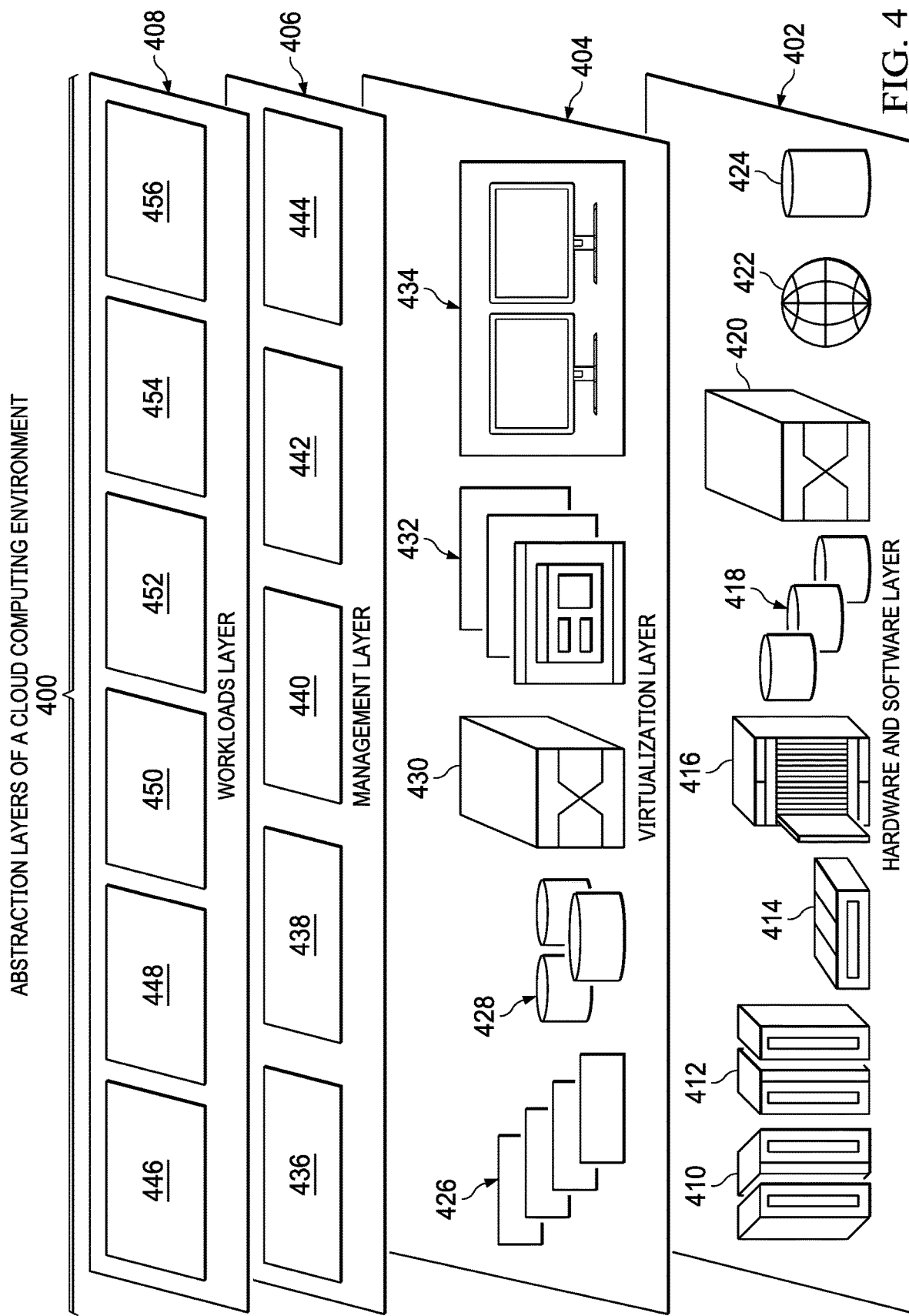
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and cloud resource customization management 456.

Three main types of potential business issues exist for cloud providers. A first issue is that customers may encounter a bad user experience. For example, provisioning an application may take a long time, a running application may encounter a high long-tail response time, and the like. One reason for the bad performance may be shortage of cloud resources, such as, for example, processor, memory, storage, and network resources. Potential contributors to shortage of cloud resources may include, for example, misbehaved applications attacking the cloud platform in the way that exhausts processor, memory, storage, and network resources, zombie or inactive applications that still consume cloud resources, abuse applications that consume extra cloud resources not required, and the like. These misbehaved, zombie, and abuse applications should be detected and handled in a timely manner by taking one or more actions, such as, for example, stopping or suspending these applications, to improve user experience of customers.

A second issue is that cloud resources may be wasted. Public cloud providers need to reserve resources in advance for new customers in the future, existing customers wanting to scale up on resources, and maintenance activities, for example. However, some resources, such as processor, memory, storage, and network resources, are wasted without customer revenue due to zombie applications, applications owned by customers with high likelihood of churning, and the like. Customer churning (i.e., customer attrition) occurs when a customer stops doing business with a cloud service.

A third issue is that applications of prospective customers with a high likelihood to convert to paying customers or applications of high value premium customers may suffer improper resource control. For example, with existing resource control methodologies, it is possible for applications belonging to prospective or premium customers to be stopped, suspended, or suffer severe resource shortage. This improper resource control degrades the confidence and satisfaction of those prospective and premium customers on the cloud platform.

To address these issues above, illustrative embodiments utilize machine learning for customizing cloud resource allocation to increase user experience for cloud customers. These potential issues affect not just existing customers, but also prospective customers. Current resource control methodologies can control resource allocation at a high level, but do not take into account a current customer's likelihood to churn or a prospective customer's likelihood to convert to a paying customer. In addition, not all customers are of equal value to a cloud provider. Illustrative embodiments utilize churn analysis and sales lead predictive analysis to identify which customers are of greater value to a cloud provider. Further, illustrative embodiments couple the churn analysis and sales lead predictive analysis with a predictive analysis of how likely an application is a misbehaved application. This coupling of analyses enables illustrative embodiments to identify which resources are legitimate and to determine which resources to throttle and how much to throttle the resources.

Illustrative embodiments generate a customized cloud resource strategy for each customer of a cloud provider based on predictive analysis values. For example, illustrative embodiments utilize a machine learning prediction algorithm, such as, for example, logistic regression, decision tree, or the like, to evaluate resource usage from an application's perspective. In addition, illustrative embodiments leverage a machine learning algorithm to calculate a customer value score for current customers based on customer recency, customer frequency, customer revenue, and the like. Customer recency represents how recently has a customer utilized resources of the cloud service. Customer frequency represents how often the customer utilizes the resources of the cloud service. Customer revenue represents how much the customer pays for utilizing the resources of the cloud service. Further, illustrative embodiments utilize a clustering algorithm, such as, for example, a k-means clustering algorithm, to cluster current customers based on corresponding customer value scores. Furthermore, illustrative embodiments utilize a machine learning prediction algorithm, such as, for example, random forest, deep learning, or the like, to predict the likelihood of prospective customers becoming paying customers in the future based on collected user behavior data corresponding to the prospective customers stored in user profiles associated with each prospective customer.

Illustrative embodiments combine the likelihood of applications misbehaving and the likelihood of a current customer churning or a prospective customer converting to a paying customer in the future, to determine how to perform resource control for cloud applications, and to maintain a balance between cloud platform availability (i.e., performance) and winning potential customers. Thus, illustrative embodiments utilize a machine learning-based system to dynamically optimize reserved cloud resources to provide increased user experience of customers and promote sales based on analysis of multiple factors.

Currently, some cloud providers use static rules for resource allocation with static resource usage thresholds, which is very rigid and does not allow for flexibility. Some cloud providers do not use any resource allocation rules at all, which results in other issues. Illustrative embodiments use resource utilization patterns and Operation Support System data to classify workload type. Moreover, illustrative embodiments leverage Business Support System data, sales department data, and marketing department data to predict the likelihood of a trial prospective customer converting to a subscriber. In addition, illustrative embodiments calculate a customer value score for each current customer based on customer bill data and domain knowledge. Then, illustrative embodiments dynamically customize customer resource allocation rules and identify opportunities to scale up resources based on workload type, likelihood of prospective customer conversion, and customer value score.

Illustrative embodiments dynamically customize customer resource utilization by performing several steps. First, illustrative embodiments evaluate resource usage from the application's perspective by predicting the likelihood of an application being misbehaved based on attributes or characteristics of the application's resource usage, such as, for example, amount of processor usage, network bandwidth usage, memory usage, disk space usage, and the like, corresponding application labels, and application tags applied by a support ticketing system. Second, illustrative embodiments calculate a customer value score for each respective current customer based on customer recency, customer frequency, customer revenue, and the like. Illustrative embodiments then cluster the current customers based on respective customer value scores. Third, illustrative embodiments predict the likelihood of prospective customers becoming paying customers in the future based on collected user behavior data. Afterward, illustrative embodiments customize the resource utilization strategy for each customer based on information obtained from the steps above.

Thus, illustrative embodiments provide one or more technical solutions that overcome a technical problem with allocating cloud resources corresponding to a service on a per user basis. As a result, these one or more technical solutions provide a technical effect and practical application in the field of customizing cloud resource allocation based on machine learning.

Figure 5B:
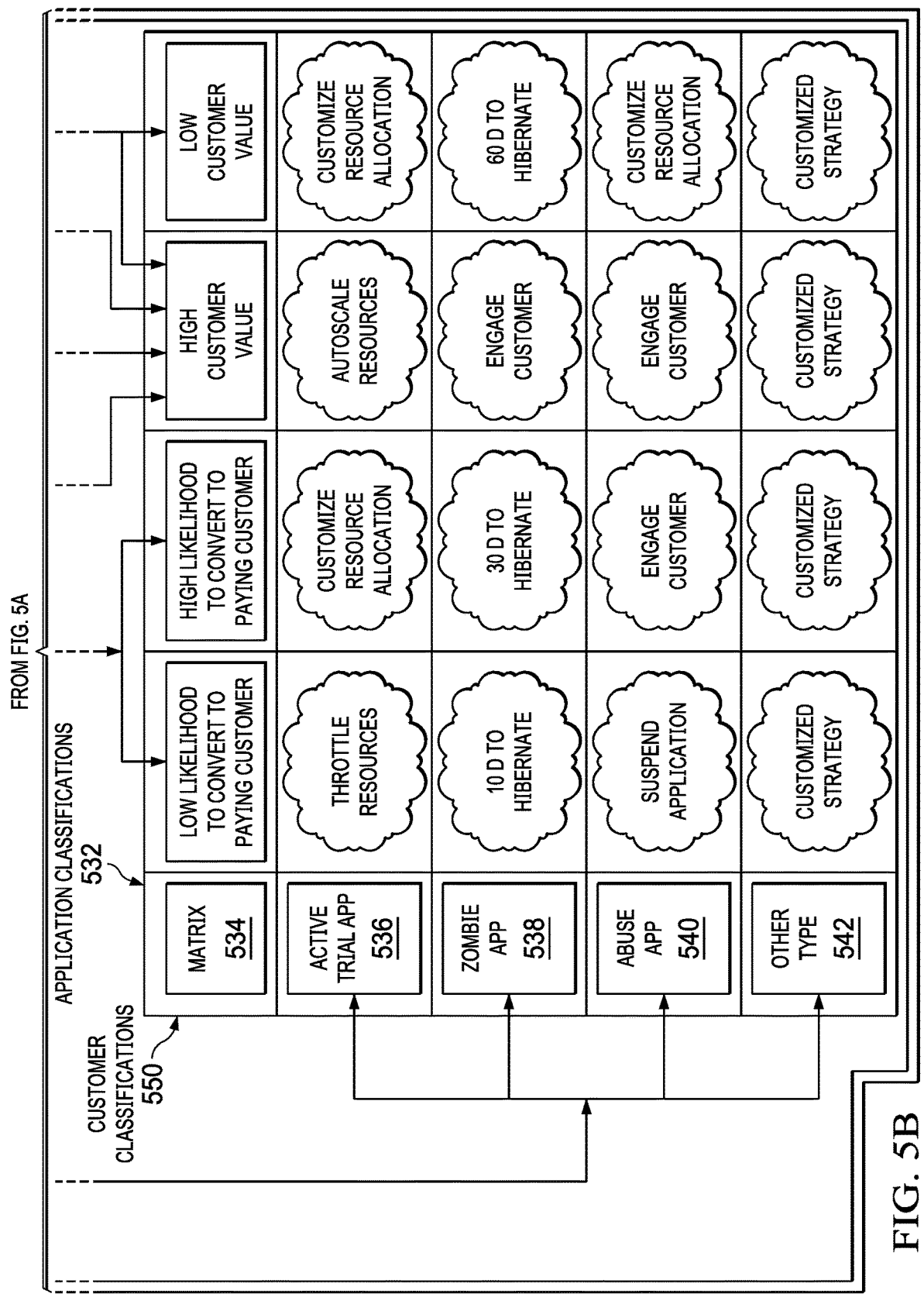

With reference now to FIGS. 5A-5B, a diagram illustrating an example of a resource customization management system is depicted in accordance with an illustrative embodiment. Resource customization management system 500 may be implemented in a network of data processing systems, such as network data processing system 100 in FIG. 1, or a cloud computing environment, such as cloud computing environment 300 in FIG. 3. Resource customization management system 500 is a system of hardware and software components for customizing cloud resource allocation on a per user basis based on machine learning.

In this example, resource customization management system 500 includes resource customization server 502 and data sources 504. Resource customization server 502 may be, for example, resource customization server 108 in FIG. 1, data processing system 200 in FIG. 2, or a cloud computing node in cloud computing nodes 310 in FIG. 3. Data sources 504 may include, for example, any server, storage, or client device, such as server 104, server 106, storage 110, and clients 112-116 in FIG. 1, coupled to resource customization server 502. Data sources 504 store a plurality of different information, such as customer data 506, sales data 508, and marketing data 510, corresponding to a cloud service, such as service 220 in FIG. 2.

Resource customization server 502 receives customer data 506, sales data 508, and marketing data 510 from data sources 504 on a defined time interval basis or on demand and stores customer data 506, sales data 508, and marketing data 510 in data store 512. Resource customization server 502 utilizes the information stored in data store 512 to identify resource usage data 514. Resource usage data 514, may be, for example, resource usage 224 in FIG. 2, and represent information corresponding to the utilization of one or more cloud resources by a set of one or more applications associated with a particular user of the cloud service. In this example, resource usage data 514 include CPU usage 516, network bandwidth usage 518, memory usage 520, and disk usage 522. However, it should be noted that resource usage data 514 may include any information regarding usage of any type of cloud resource.

Resource customization server 502 also retrieves application labels 524 and support ticket data 526 corresponding to the set of applications of the cloud service. A system administrator, for example, may assign application labels 524 to the set of applications. A support ticketing system, for example, may assign tags, such as application failure, to the set of applications to form support ticket data 526.

Resource customization server 502 utilizes resource usage data 514, application labels 524, and support ticket data 526 to generate labeled machine learning data 528. At 530, a machine learning component, such as machine learning component 219 in FIG. 2, of resource customization server 502 uses labeled machine learning data 528 to make a determination as to how to classify the set of applications of the cloud service. Based on the determination at 530, the machine learning component places each application in the set of applications in an application classification of application classifications 532 of matrix 534. In this example, application classifications 532 include active trial application 536, zombie application 538, abuse application 540, and other type of application 542, such as a standard application or normal application. A standard application or normal application is an application that is not misbehaving or is operating in a regular or routine manner for the cloud service.

Resource customization server 502 also utilizes the information stored in data store 512 to identify prospective customers 544. Prospective customers 544 may be, for example, prospective users 234 in FIG. 2, and may represent non-paying trial period customers. Resource customization server 502 further utilizes the information stored in data store 512 to identify behavior data 546, such as behavior data 242 in FIG. 2, corresponding to each respective prospective customer in prospective customers 544.

At 547, the machine learning component of resource customization server 502 uses behavior data 546 to make a determination as to how to classify each of prospective customers 544. Based on the determination at 547, the machine learning component makes prediction 548 regarding each of prospective customers 544. Prediction 548 is a forecast or estimate of the likelihood of each respective customer in prospective customers 544 becoming a paying customer in the future. Based on prediction 548, the machine learning component places each of prospective customers 544 in a customer classification of customer classifications 550 of matrix 534. In this example, customer classifications 550 corresponding to prospective customers 544 include low-likelihood to convert to paying customer and high-likelihood to convert to paying customer.

Furthermore, resource customization server 502 utilizes the information stored in data store 512 to identify current customers 552. Current customers 552 may be, for example, current users 232 in FIG. 2, and may represent existing paying customers of the cloud service. Resource customization server 502 further utilizes the information stored in data store 512 to identify attribute data 554, such as attribute data 236 in FIG. 2, corresponding to each respective current customer in current customers 552.

In this example, attribute data 554 include customer recency 556, customer frequency 558, and customer revenue 560. Resource customization server 502 utilizes customer recency 556, customer frequency 558, and customer revenue 560 to generate customer value score 561, such as value score 238 in FIG. 2, for each respective current customer in current customers 552. At 562, resource customization server 502 utilizes a clustering algorithm to make a determination as to how to cluster current customers 552 into customer groups, such as user groups 240 in FIG. 2, based on customer value score 516 of each respective current customer in current customers 552. In this example, customer groups include a low customer value group and a high customer value group in customer classifications 550 for current customers 552. Resource customization server 502 may also utilize domain knowledge 564 to further differentiate high-value customers. Domain knowledge 564 may include, for example, dedicated account customer information, private cloud customer information, and the like. Resource customization server 502 utilizes matrix 534 to determine how to customize resource allocation for each particular user of the cloud service based on application classification 532 and customer classification 550 corresponding to that particular user.

With reference now to FIG. 6, a flowchart illustrating a process for customizing cloud resource allocation based on machine learning is shown in accordance with an illustrative embodiment. The process shown in FIG. 6 may be implemented in a computer, such as, for example, resource customization server 108 in FIG. 1, data processing system 200 in FIG. 2, a cloud computing node in cloud computing nodes 310 in FIG. 3, or resource customization server 502 in FIGS. 5A-5B.

The process begins when the computer evaluates a plurality of current users of a cloud service based on attributes of each respective current user in the plurality of current users (step 602). The computer generates a user value score for each respective current user in the plurality of current users based on the attributes of each respective current user (step 604). The computer, using a clustering algorithm, clusters the plurality of current users into a plurality of user groups based on the user value score of each respective current user in the plurality of current users (step 606).

In addition, the computer, using machine learning, predicts a likelihood of each prospective user in a plurality of prospective users becoming a paying customer based on collected behavior data corresponding to each prospective user (step 608). Further, the computer selects a particular user from one of the plurality of current users and the plurality of prospective users (step 610). Moreover, the computer, using machine learning, predicts a likelihood of an application corresponding to the cloud service and associated with the particular user will misbehave based on resource usage of the application and features of the application (step 612).

Afterward, the computer customizes resource allocation to the application corresponding to the cloud service and associated with the particular user based the likelihood that the application will misbehave and whether the particular user is a current user or a prospective user (step 614). If the particular user is a current user, then customization of the resource allocation to the application is further based on a user group corresponding to the particular user. If the particular user is a prospective user, then customization of the resource allocation is further based on the likelihood that the prospective user will convert to a paying customer.

Subsequently, the computer makes a determination as to whether another user exists in the plurality of current users or the plurality of prospective users (step 616). If the computer determines that another user does exist in the plurality of current users or the plurality of prospective users, yes output of step 616, then the process returns to step 610 where the computer selects another particular user. If the computer determines that another user does not exist in the plurality of current users or the plurality of prospective users, no output of step 616, then the process terminates thereafter.

Thus, illustrative embodiments of the present invention provide a computer-implemented method, computer system, and computer program product for customizing cloud resource allocation based on machine learning. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for customizing computing resource allocation based on machine learning, the method comprising:
   evaluating a plurality of current users of a service based on attributes of each respective current user in the plurality of current users;
   generating a user value score for each respective current user in the plurality of current users based on the attributes of each respective current user;
   clustering the plurality of current users into a plurality of user groups based on the user value score of each respective current user in the plurality of current users;
   predicting, using the machine learning, a likelihood of each prospective user in a plurality of prospective users becoming a paying customer based on collected behavior data corresponding to each prospective user;
   predicting, using the machine learning, a likelihood of an application corresponding to the service and associated with a particular user will misbehave based on resource usage of the application and features of the application;
   customizing resource allocation to the application corresponding to the service and associated with the particular user based on the likelihood that the application will misbehave and whether the particular user is a current user or a prospective user; and
   selecting the particular user from one of the plurality of current users and the plurality of prospective users, wherein the customized resource allocation represents a customized allocation of cloud resources to the application, and the cloud resources comprises at least one processor resource, memory resources, storage resources and network resources, wherein the user value score for each respective current user represents a degree of importance the each respective current user is to the service that the application corresponds to, wherein when the particular user is a prospective user, the customizing of the resource allocation to the application is further based on the likelihood that the prospective user will convert to the paying customer, wherein the resource usage of the application is selected from a group consisting of processor usage, memory usage, storage usage, and network usage, and further comprising:
   identifying, using the machine learning, a classification for the application based on the resource usage of the application and the features of the application, wherein the classification represents an application class, category or type corresponding to the application.

2. The method of claim 1, wherein when the particular user is a current user, the customizing of the resource allocation to the application is further based on a user group of the plurality of user groups corresponding to the particular user.

3. The method of claim 1, wherein the generated user value score is calculated using the machine learning, and wherein the attributes of each respective current user are selected from a group consisting of user recency data representing how recently has the each respective current user utilized resources of a cloud service, user frequency data representing how often the each respective current user utilizes the resources of the cloud service, and user revenue data that represents how much the each respective current user pays for utilizing the resources of the cloud service.

4. The method of claim 1, wherein the collected behavior data corresponding to each prospective user that is the basis for predicting the likelihood of each respective user of the plurality of users becoming the paying customer include a history of which applications a particular prospective user used during a trial period, a frequency of application use, and how long an application was used during a trial session of the prospective user.

5. The method of claim 1, wherein the application corresponding to the service is classified as one of a trial application of a non-paying subscription to a cloud service, or a zombie application that is inactive but continues to consume the cloud resources.

6. The method of claim 1, wherein the service is a cloud service, and further comprising:
   placing each application in a set of applications of the cloud service in a particular application classification of application classifications in a matrix;
   placing each prospective user in a particular customer classification of customer classifications in the matrix; and
   utilizing the matrix to determine how to customize the resource allocation to the application for each particular user of the cloud service based on the application classification and the customer classification corresponding to the particular user.

7. A computer system for customizing computing resource allocation based on machine learning, the computer system comprising:
   a bus system;
   a storage device connected to the bus system, wherein the storage device stores program instructions; and
   a processor connected to the bus system, wherein the processor executes the program instructions to:
      evaluate a plurality of current users of a service based on attributes of each respective current user in the plurality of current users;
      generate a user value score for each respective current user in the plurality of current users based on the attributes of each respective current user;

cluster the plurality of current users into a plurality of user groups based on the user value score of each respective current user in the plurality of current users;
predict, using the machine learning, a likelihood of each prospective user in a plurality of prospective users becoming a paying customer based on collected behavior data corresponding to each prospective user;
predict, using the machine learning, a likelihood of an application corresponding to the service and associated with a particular user will misbehave based on resource usage of the application and features of the application;
customize resource allocation to the application corresponding to the service and associated with the particular user based on the likelihood that the application will misbehave and whether the particular user is a current user or a prospective user; and
select the particular user from one of the plurality of current users and the plurality of prospective users, wherein the customized resource allocation represents a customized allocation of cloud resources to the application, and the cloud resources comprises at least one processor resource, memory resources, storage resources and network resources, wherein the user value score for each respective current user represents a degree of importance the each respective current user is to the service that the application corresponds to, wherein when the particular user is a prospective user, customizing of the resource allocation to the application is further based on the likelihood that the prospective user will convert to the paying customer, wherein the resource usage of the application is selected from a group consisting of processor usage, memory usage, storage usage, and network usage, and wherein the processor further executes the program instructions to:
identify a classification for the application based on the resource usage of the application and the features of the application, wherein the classification represents an application class, category or type corresponding to the application.

8. The computer system of claim 7, wherein when the particular user is a current user, customizing the resource allocation to the application is further based on a user group of the plurality of user groups corresponding to the particular user.

9. A computer program product for customizing computing resource allocation based on machine learning, the computer program product comprising a computer readable storage medium having program instructions embodied therewith, the program instructions executable by a computer to cause the computer to perform a method comprising:
evaluating a plurality of current users of a service based on attributes of each respective current user in the plurality of current users;
generating a user value score for each respective current user in the plurality of current users based on the attributes of each respective current user;
clustering the plurality of current users into a plurality of user groups based on the user value score of each respective current user in the plurality of current users;
predicting, using the machine learning, a likelihood of each prospective user in a plurality of prospective users becoming a paying customer based on collected behavior data corresponding to each prospective user;
predicting, using the machine learning, a likelihood of an application corresponding to the service and associated with a particular user will misbehave based on resource usage of the application and features of the application;
customizing resource allocation to the application corresponding to the service and associated with the particular user based on the likelihood that the application will misbehave and whether the particular user is a current user or a prospective user; and
selecting the particular user from one of the plurality of current users and the plurality of prospective users, wherein the customized resource allocation represents a customized allocation of cloud resources to the application, and the cloud resources comprises at least one processor resource, memory resources, storage resources and network resources, wherein the user value score for each respective current user represents a degree of importance the each respective current user is to the service that the application corresponds to, wherein when the particular user is a prospective user, the customizing of the resource allocation to the application is further based on the likelihood that the prospective user will convert to the paying customer, wherein the resource usage of the application is selected from a group consisting of processor usage, memory usage, storage usage, and network usage, and further comprising:
identifying, using the machine learning, a classification for the application based on the resource usage of the application and the features of the application, wherein the classification represents an application class, category or type corresponding to the application.

10. The computer program product of claim 9, wherein when the particular user is a current user, the customizing of the resource allocation to the application is further based on a user group of the plurality of user groups corresponding to the particular user.

11. The computer program product of claim 9, wherein the generated user value score is calculated using the machine learning, and wherein the attributes of each respective current user are selected from a group consisting of user recency data representing how recently has the each respective current user utilized resources of a cloud service, user frequency data representing how often the each respective current user utilizes the resources of the cloud service, and user revenue data that represents how much the each respective current user pays for utilizing the resources of the cloud service.

12. The computer program product of claim 9, wherein the collected behavior data corresponding to each prospective user that is the basis for predicting the likelihood of each respective user of the plurality of users becoming the paying customer include a history of which applications a particular prospective user used during a trial period, a frequency of application use, and how long an application was used during a trial session of the prospective user.

13. The computer program product of claim 9, wherein the application corresponding to the service is classified as one of a trial application of a non-paying subscription to a cloud service, or a zombie application that is inactive but continues to consume the cloud resources.

* * * * *